United States Patent [19]

Bryan et al.

[11] Patent Number: 5,015,069

[45] Date of Patent: May 14, 1991

[54] OFF AXIS ROTATION OF DIFFRACTION GRATING

[75] Inventors: Raymond G. Bryan; Louis Hlousek, both of Reno, Nev.

[73] Assignee: Linear Instruments, Reno, Nev.

[21] Appl. No.: 312,537

[22] Filed: Feb. 17, 1989

[51] Int. Cl.⁵ .................... G02B 5/18; G02B 26/06
[52] U.S. Cl. .................... 350/162.17; 350/162.23; 350/6.5; 356/319
[58] Field of Search ............... 350/162.17, 162.22, 350/162.23, 162.24, 6.5, 6.91, 3.71; 356/319

[56] References Cited

U.S. PATENT DOCUMENTS

| 4,443,055 | 4/1984 | Matsuoka et al. | 350/6.5 |
| 4,669,878 | 6/1987 | Meier | 356/319 |
| 4,775,205 | 10/1988 | Muramatsu | 350/6.5 |

FOREIGN PATENT DOCUMENTS 2072841A 10/1981 United Kingdom ............ 356/319
2133138A 7/1984 United Kingdom ............ 356/319

Primary Examiner—Rodney B. Bovernick
Assistant Examiner—David R. Parsons
Attorney, Agent, or Firm—Skjerven, Morrill, MacPherson, Franklin & Friel

[57] ABSTRACT

In a spectrophotometer application where high speed positioning is critical, a galvanometer in conjunction with a microprocessor controlled hybrid digital/analog servo system is used to rotate a diffraction grating for wavelength selection. A table containing digital position information for all wavelengths is accessed by the microprocessor to perform wavelength changes. The use of the table permits the determination of grating position to yield a desired wavelength for a system where the axis of rotation does not intersect a point on the surface of the diffraction grating. That is, the diffraction grating can be rotated about an axis coinciding with its center of gravity.

10 Claims, 17 Drawing Sheets

```
10   INPUT"ENTER WAVELENGTH;L
20   PI = 4*ATN(1):L2=200:N=.0012:R=.912876
30   T = PI*45/180:L1=223:P=.7
40   X = ATN(R*SIN(T-P)/(L2-R*COS(T-P)))
50   Y = ATN(R*SIN(P)/(L1-R*COS(P)))
60   Z = N*L-SIN(P+Y)
70   W = ATN (Z/SQR(1-Z^2))
80   PP = W+X+T
90   IF ABS(PP-P)<.00001 THEN 110
100  P=PP:GOTO 40
110  PRINT "GRATING POSITION ANGLE =";PP*180/PI;
            "DEGREES"
```

FIGURE 4

KEY TO
FIGURE 5A

| FIGURE 5A' |
| FIGURE 5A" |
| FIGURE 5A''' |

```
10    REM       LINEAR INSTRUMENTS CORPORATION
                UVIS-206 D TO A DATA PROGRAM
20    REM       FOR CREATING A CALIBRATED SERVO
                CONTROLLER EPROM FROM
30    REM       MERCURY LAMP SCAN UNDER PROGRAM
                CONTROL
40    REM       BY RAY BRYAN, P.E.; MECHANICAL
                ENGINEER, REVISED 1/11/89
50    CLOSE : A$ = "": B$ = "": C$ = "": D$ = ""
60    PI = 4 * ATN(1): L2 = 200: N = .0012: R = .912876: DDMAX =
      0: DWMAX = 0
70    C = 4095 * (180 / (PI * 25)):  DDMIN = 1000: DWMIN = 1000
80    SX = 0: SY = 0: X2 = 0: XY = 0
90    DIM SB(9), AC(9), AB(10), DD(800), DW(801), B(80)
100   CLS : PRINT "UVIS-206 CALIBRATION PORGRAM": PRINT :
      PRINT "WRITTEN BY RAY BRYAN, P.E.; MECHANICAL
      ENGINEER"
110   PRINT: REVISED 1/11/89": PRINT : PRINT " IS THE UVIS-206
      TO BE CALIBRATED ATTACHED TO COM1: ?"
120   PRINT "IS THE UVIS-206 POWERED ON?": PRINT "IS A
      MERCURY LAMP ATTACHED TO THE UVIS-206 WITH THE
      POWER ON ?"
130   PRINT " IS A DISK CONTAINING THE FILE
      '6803PROG.HEX' INSTALLED IN DRIVE 'A' ?"
```

FIGURE 5A'

```
140   PRINT "IS THE EPROM PROGRAMMER ATTACHED TO
      COM2: ?"
150   PRINT "IS A BLANK EPROM IN THE PROGRAMMER ?":
      PRINT "IS THE POWER TO THE PROGRAMMER ON ?"
160   PRINT : PRINT "(Y/N);" : INPUT B$: IF B$<> "Y" AND B$ <>
      "y" THEN PRINT "CORRECT ANY PROBLEMS WITH
      ABOVE REQUIREMENTS AND RE-START PROGRAM":
      END
170   CLS
180   INPUT "ENTER ASSEMBLY NUMBER AS THREE DIGITS";
      E$: E$ = "A:\DTOADATA." + E$
190   PRINT "PERFORMING LINE SCAN ON UVIS-206"
200   REM       OPEN COMMUNICATIONS WITH 206 AND
                PERFROM LINE SCAN
210   OPEN "COM1:9600,N,8,1" FOR RANDOM AS #1
220   REM       SET I-REGISTER $13 (SYNC. CYCLE) TO 399
230   PRINT #1, CHR$(87); CHR$(19); CHR$(1); CHR$(143);
240   REM       SET I-REGISTER $7E (SCAN START VALUE) TO
                4095
250   PRINT #1, CHR$(87); CHR$(126); CHR$(15); CHR$(255);
260   REM       SET I-REGISTER $7F (SCAN FINAL VALUE) TO
                0
270   PRINT #1, CHR$(87); CHR$(127); CHR$(0); CHR$(0);
280   REM       SET I-REGISTER $2F (THRESHOLD) TO 100
290   PRINT #1, CHR$(87); CHR$(47); CHR$(0); CHR$(100);
300   REM       CLEAR I-REGISTER $3 BIT 8 TO SELECT
                REFERENCE DIODE
310   PRINT #1, CHR$(84); CHR$(3); CHR$(8);
320   REM       CLEAR I-REGISTER $3 BIT 10 TO POSITION
                SHUTTER  FOR D2 LAMP
330   PRINT #1, CHR$(84); CHR$(3); CHR$(10);
340   REM       SET I-REGISTER $1 BIT 3 TO ENTER LINE
                SCAN MODE
350   PRINT #1, CHR$84; CHR$(1); CHR$(131);
360   REM       WAIT 3 SECONDS
370   X = TIMER
380   IF (TIMER - X) < 3 THEN 380
390   REM       CLEAR I-REGISTER $3 BIT 6 TO SELECT
                ABSOLUTE SCAN
400   PRINT #1, CHR$(84); CHR$(3); CHR$(6);
410   REM       SET I-REGISTER $3 BIT 12 TO START SCAN
```

FIGURE 5A"

```
420  PRINT #1, CHR$(84); CHR$(3); CHR$(140);
430  X = 0
440  A$ = INPUT$(1, #1)
450  REM        CHECK FOR START OF RECORD FOR PEAK AS
                "%"
460  IF A$ = CHR$(37) THEN 500
470  REM        CHECK FOR END OF SCAN AS "!"
480  IF A$ = CHR$(33) THEN 620
490  GOTO 440
500  X = X + 1: IF X > 10 THEN PRINT "TOO MANY LINES!":
     PRINT "CHECK SET-UP AND RE-START PROGRAM":
     CLOSE : END
510  REM        COLLECT RECORD FOR PEAK
520  A$ = INPUT$(1, #1): IF A$ = "" THEN 520
530  AB(X) = ASC(A$) * 256
540  A$ = INPUT$(1, #1): IF A$ = "" THEN 540
550  AB(X) = AB(X) + ASC(A$)
560  A$ = INPUT$(1, #1): IF A$ = "" THEN 560
570  A$ = INPUT$(1, #1): IF A$ = "" THEN 570
580  A$ = INPUT$(1, #1): IF A$ = "" THEN 580
590  A$ = INPUT$(1, #1): IF A$ = "" THEN 590
600  A$ = INPUT$(1, #1): IF A$ = "" THEN 600
610  GOTO 440
620  IF X < 9 THEN PRINT "NOT ENOUGH LINES!": PRINT
     "CHECK SET-UP AND RE-START PROGRAM": CLOSE :
     END
630  REM        SET I-REGISTER $13 (SYNC. CYCLE) TO 99
640  PRINT #1, CHR$(87); CHR$(19); CHR$(0); CHR$(99);
650  REM        CLEAR I-REGISTER $1 BIT 3 TO EXIT LINE
                SCAN MODE
660  PRINT #1; CHR$(84); CHR$(1); CHR$(3);
670  CLOSE
680  PRINT "LINE SCAN COMPLETE. PERFORMING LEAST
     SQUARE CORRECTION CALCULATION"
690  REM        NOMINAL D TO A VALUES FOR MERCURY
                LINES
```

FIGURE 5A'''

KEY TO FIGURE 5B

| FIGURE 5B' |
|---|
| FIGURE 5B" |
| FIGURE 5B''' |

```
700   SB(1) = 3399.079
710   SB(2) = 3133.107
720   SB(3) = 3032.641
730   SB(4) = 2708.225
740   SB(5) = 2459.502
750   SB(6) = 2262.621
760   SB(8) = 1555.768
770   SB(9) = 1343.356
780   REM        LEAST SQUARES CALCULATION FOR 206
                 CALIBRATION DATA
790   FOR X = 1 TO 9
800   IF X = 7 THEN 840
810   AC(X) = SB(X) - AB(X)
820   SX = SX + SB(X): SY = SY + AC(X)
830   X2 = X2 + (SB(X) ^ 2): XY = XY + SB(X) * AC(X)
840   NEXT X
850   XM = SX / 8: YM = SY / 8
860   S = (XY - 8 * XM * YM) / (X2 - 8 * (XM ^ 2))
870   B = YM - S * XM
880   REM        PRINTOUT FOR EFFECTS OF CALIBRATION
                 ON THIS UNIT
890   LPRINT "UVIS-206 CALIBRATED EPROM INFORMATION
      FOR ASSEMBLY NUMBER "; RIGHT$(E$, 3)
```

FIGURE 5B'

```
900  LPRINT
910  LPRINT "SLOPE="; S: LPRINT "INTERCEPT="; B
920  FOR X = 1 TO 9
930  IF X = 7 THEN 950
940  LPRINT "ERROR AT"; SB(X); "="; (SB(X) - (SB(X) * S + B)) -
     AB(X)
950  NEXT X
960  REM          CALCULATE AND CORRECT D TO A DATA
                  FOR THIS UNIT
970  PRINT "CALCULATING D TO A VALUES"
980  REM          FIND ANGLE FOR W LAMP AT 800 NM
990  T = PI * 53 / 180: L1 = 206: L = 800: GOSUB 2890
1000 P1 = PP - PI * 8 / 180
1010 REM          FIND ANGLE FOR D2 LAMP AT 190 NM
1020 T = PI * 45 / 180: LI = 223: L = 190: GOSUB 2890
1030 PO = PP
1040 REM          FIND MAXIMUM NOMINAL D TO A VALUE
                  "M"
1050 M = C * ((PI * 25 / 180) - ((PI * 25 / 180) - (P1 - PO)) / 2)
1060 REM          FIND D TO A VALUE FOR D2 ATOMIC LINE
                  AT 656.1 NM
1070 L = 656.1: GOSUB 2890
1080 DW(801) = M - ((PP - PO) * C)
1090 REM          CORRECT D TO A VALUE FOR D2 ATOMIC
                  LINE
1100 DW(801) - INT(DW(801) - (S * DW(801) + B) + .5)
1110 REM          FIND D TO A VALUES FOR D2 WAVELENGTHS
1120 FOR L = 190 TO 800: GOSUB 2890
1130 DD(L) = M - ((PP - PO) * C)
1140 REM          CORRECT D TO A VALUES FOR D2
                  WAVELENGTHS
1150 DD(L) = INT(DD(L) - (S * DD(L) + B) + .5)
1160 PRINT "D"; L: NEXT L
1170 REM          FIND D TO A VALUES FOR W WAVELENGTHS
1180 T = PI * 53 / 180: L1 = 206: PO = PO + PI * 8 / 180
1190 FOR L = 190 TO 800: GOSUB 2890
1200 DW(L) = M - ((PP - PO) * C)
1210 REM          CORRECT D TO A VALUES FOR W
                  WAVELENGTHS
```

FIGURE 5B"

1220  DW(L) = INT(DW(L) - (S * DW(L) + B) + .5)
1230  PRINT "W"; L: NEXT L
1240  PRINT "FINDING MINIMUM AND MAXIMUM D TO A VALUES"
1250  REM        FIND MIMIMUM AND MAXIMUM D TO A VALUES FOR D2 LAMP
1260  L = 190
1270  L = L + 1
1280  IF DD(L) < DW(800) THEN DDE = L: GOTO 1330
1290  IF ABS(DD(L) - DD(L - 1)) < DDMIN THEN DDMIN = ABS(DD(L) - DD(L - 1))

FIGURE 5B'''

**KEY TO
FIGURE 5C**

| FIGURE 5C' |
|---|
| FIGURE 5C'' |
| FIGURE 5C''' |

1300 IF ABS(DD(L) - DD(L - 1)) > DDMAX THEN DDMAX = ABS(DD(L) - DD(L - 1))
1310 GOTO 1270
1320 REM        FIND MINIMUM AND MAXIMUM D TO A VALUES FOR W LAMP
1330 L = 800
1340 L = L - 1
1350 IF DW(L) > DD(190) THEN DWE = L: GOTO 1400
1360 IF ABS(DW(L) - DW(L + 1)) < DWMIN THEN DWMIN =ABS(DW(L) - DW(L + 1))
1370 IF ABS(DW(L) - DW(L + 1)) > DWMAX THEN DWMAX =ABS(DW(L) - DW(L + 1))
1380 GOTO 1340
1390 REM        PRINT THE MAXIMUM AND MINIMUM CHANGE IN D TO A VALUES FOR BOTH LAMPS
1400 LPRINT "MAXIMUM CHANGE IN D TO A FOR D2 LAMP="; DDMAX

FIGURE 5C'

```
1410 LPRINT "MINIMUM CHANGE IN D TO A FOR D2 LAMP
     ="; DDMIN
1420 LPRINT "MAXIMUM CHANGE IN D TO A FOR W LAMP =";
     DWMAX
1430 LPRINT "MINIMUM CHANGE IN D TO A FOR W LAMP=";
     DWMIN
1440 REM       CHECK FOR MINIMUM AND MAXIMUM D TO A
               VALUES IN VALID RANGE
1450 IF DW(800) < 64 THEN 1480
1460 IF DD(190) > 4031 THEN 1480
1470 GOTO 1500
1480 PRINT "CORRECTED D TO A VALUES OUT OF RANGE!":
     PRINT "CHECK CALIBRATION SET-UP AND GRATING
     NEUTRAL POSITION."
1490 PRINT "RESTART CALIBRATION PROGRAM AFTER MAKING
     CORRECTIONS.": END
1500 PRINT "ADJUSTING D TO A VALUES TO MINIMUM AND
     MAXIMUM LIMITS"
1510 REM       SET ALL OUT OF RANGE D2 VALUES TO
               MINIMUM W VALUE
1520 FOR L = DDE TO 800
1530 DD(L) = DW(800)
1540 NEXT L
1550 REM       SET ALL OUT OF RANGE W VALUES TO
               MAXIMUM D2 VALUE
1560 FOR L = 190 TO DWE
1570 DW(L) = DD(190)
1580 NEXT L
1590 L = 190
1600 PRINT "WRITING HEX FILE FOR D TO A VALUES AND 6803
     PROGRAM TO"; E$
1610 REM       OPEN DTOADATA.XXX FILE ON DRIVE A
1620 OPEN E$ FOR OUTPUT AS #3
1630 REM       CONFIGURE 38 LINES OF D2 LAMP D TO A
               VALUES TO INTEL HEX CODE
1640 FOR X = 0 TO 38
1650 REM       CHECK FOR LAST LINE OF D2 LAMP HEX CODE
1660 Z = 16: IF L > 797 THEN Z = 3
1670 PRINT #3, CHR$(58);
1680 B(2) = INT(2 * Z / 16)
1690 B(3) = 16 * (2 * Z / 16 - B(2))
1700 B(4) = 6
1710 B(5) = INT(X * 32 / 256)
```

FIGURE 5C"

```
1720  B(6) = INT(256 * (X * 32 / 256 - B(5)) / 16)
1730  B(7) = 0: B(8) = 0: B(9) = 0
1740  FOR W = 10 TO (Z * 4 + 6) STEP 4
1750  B(W) = 0
1760  B(W + 1) = INT(DD(L) / 256)
1770  B(W + 2) = INT(256 * (DD(L) / 256 - B(W + 1)) / 16)
1780  B(W + 3) = 16 * ((256 * DD(L) / 256 - B(W + 1) / 16) - B(W + 2))
1790  L = L + 1: NEXT W
1800  BS = 0
1810  FOR W = 2 TO (Z * 4 + 8) STEP 2
1820  BS = BS + B(W) * 16 + B(W+ 1)
1830  NEXT W
1840  BC = 256 - 256 *(BS / 256 - INT(BS / 256))
1850  REM         CALCULATE UPPER AND LOWER NIBBLE OF
                  CHECK SUM FOR LINE OF CODE
1860  CS1 = INT(256 * (BC / 256 - INT(BC / 256)) / 16)
1870  CS2 = 16 * ((256 * (BC / 256 - INT(BC / 256)) / 16 ) - CS1)
1880  REM         WRITE EACH LINE OF D2 LAMP HEX CODE TO
                  FILE
1890  FOR W = 2 TO (Z * 4 + 9)
1900  PRINT #3, HEX$(B(W));
1910  NEXT W
1920  REM         WRITE CHECK SUM, CARRAGE RETURN, AND
                  LINE FEED TO END OF LINE
1930  PRINT #3, HEX$(CS1); HEX$(CS2); CHR$(13); CHR$(10);
```

FIGURE 5C'''

**KEY TO
FIGURE 5D**

| FIGURE 5D' |
|---|
| FIGURE 5D" |
| FIGURE 5D'" |

```
1940  NEXT X
1950  L = 190
1960  REM       CONFIGURE 38 LINES OF W LAMP D TO A
                VALUES TO INTEL HEX CODE
1970  FOR X = 0 TO 38
1980  REM       CHECK FOR LAST LINE OF W LAMP HEX
                CODE
1990  Z = 16: IF L > 797 THEN Z = 4
2000  PRINT #3, CHR$(58);
2010  B(2) = INT(2 * Z / 16)
2020  B(3) = 16 * (2 * Z / 16 - B(2))
2030  B(4) = 6
2040  B(5) = INT((X * 32 + 1216) / 256)
2050  B(6) = INT(256 * ((X * 32 + 1216) / 256 - B(5)) / 16)
2060  B(7) = 6: B(8) = 0: B(9) = 0
2070  FOR W = 10 TO (Z * 4 + 6) STEP 4
2080  B(W) = 0
2090  B(W + 1) = INT(DW(L) / 256)
2100  B(W + 2) = INT(256 * (DW(L) / 256 - B(W + 1)) / 16)
2110  B(W + 3) = 16 * ((256 * (DW(L) / 256 - B(W + 1)) / 16) - B(W +
      2))
2120  L = L + 1: NEXT W
2130  BS = 0
2140  FOR W = 2 TO (Z * 4 + 8) STEP 2
```

FIGURE 5D'

```
2150  BS = BS + B(W) * 16 + B(W + 1)
2160  NEXT W
2170  BC = 256 - 256 * (BS / 256 - INT(BS / 256))
2180  REM          CALCULATE UPPER AND LOWER NIBBLE OF
                   CHECK SUM FOR LINE OF CODE
2190  CS1 = INT(256 * (BC / 256 - INT(BC / 256)) / 16)
2200  CS2 = 16 * ((256 * (BC / 256 - INT(BC / 256)) / 16) - CS1)
2210  REM          WRITE EACH LINE OF D2 LAMP HEX CODE TO
                   FILE
2220  FOR W = 2 TO (Z * 4 + 9 )
2230  PRINT #3, HEX$(B(W));
2240  NEXT W
2250  REM          WRITE CHECK SUM, CARRAGE RETURN, AND
                   LINE FEED TO END OF LINE
2260  PRINT #3, HEX$(CS1); HEX$(CS2); CHR$(13); CHR$(10);
2270  NEXT X
2280  REM          OPEN FILE CONTAINING 6803 PROGRAM IN
                   HEX CODE ON DRIVE A
2290  OPEN "A:6803 PROG.HEX" FOR INPUT AS #5
2300  REM          APPEND DTOADATA.XXX FILE ON DRIVE A
                   WITH 6803 HEX CODE
2310  IF EOF(5) THEN 2340
2320  C$ = INPUT$(1, #5): PRINT #3, C$;
2330  GOTO 2310
2340  CLOSE #3: CLOSE #5
2350  PRINT "INITIATING EPROM PROGRAMMER"
2360  REM          OPEN HEX FILE FROM DRIVE A FOR INPUT
                   TO EPROM
2370  OPEN E$ FOR INPUT AS #3
2380  REM          OPEN COMMUNICATINS LINE WITH EPROM
                   PROGRAMER
2390  OPEN "COM2:9600,E,7,1,CS,DS,CD" FOR RANDOM AS #1
2400  REM          OPEN SCRN: TO MONITOR ACTIVITY WITH
                   EPROM PROGRAMER
2410  OPEN "SCRN:" FOR OUTPUT AS #2
2420  REM          INITIATE COMMUNICATIONS WITH EPROM
                   PROGRAMER
2430  PRINT #1, "    ";
```

FIGURE 5D"

```
2440 GOSUB 2750
2450 PRINT #1, CHR$(13);
2460 GOSUB 2750
2470 REM        SELECT TYPE OF EPROM AS 27C256
2480 PRINT #1, "MI"; CHR$(13);
2490 GOSUB 2750
2500 REM        SET EPROM PROGRAMER TO PROGRAM
                MODE
2510 PRINT #1, "P"; CHR$(13);
2520 GOSUB 2750
2530 REM        CHECK FOR RESPONCE FROM EPROM
                PROGRAMER AND ECHO TO SCREEN
2540 IF NOT EOF(1) THEN 2590
2550 PRINT "FAILURE TO INITIATE EPROM!": PRINT "CHECK
     EPROM PROGRAMER AND PUSH ANY KEY TO
     CONTINUE; PUSH ANY KEY TO CONTINUE; PUSH E TO
     EXIT.": CLOSE
2560 B$ = INKEY$: IF B$ = "" THEN 2560
2570 IF B$ = "E" OR B$ = "e" THEN END
2580 GOTO 2370
2590 A$ = INPUT$(LOC(1), #1)
2600 PRINT #2, A$ ; : IF LOC(1) > 0 THEN 2590
2610 REM        SEND CONTENTS OF DTOADATA HEX FILE
                TO EPROM PROGRAMER
```

FIGURE 5D'''

KEY TO FIGURE 5E

| FIGURE 5E' |
|---|
| FIGURE 5E" |

```
2620  C$ = INPUT$(1, #3)
2630  PRINT #2, C$;
2640  PRINT #1, C$;
2650  REM       CHECK FOR CHARACTORS FROM EPROM
                PROGRAMER
2660  IF EOF(1) THEN 2620
2670  D$ = INPUT$(1, #1)
2680  REM       CHECK CHARACTOR FROM EPROM PROGRAMER
                FOR XOFF
2690  IF D$ = CHR$(19) THEN PRINT #2, D$: GOTO 2800
2700  PRINT #2, D$; : IF LOC(1) > 0 THEN D$ = INPUT$(LOC(1), #1):
      GOTO 2700
2710  PRINT "ERROR DETECTED FROM EPROM PROGRAMER!":
      PRINT "REPLACE EPROM AND PUSH ANY KEY TO TRY
      AGAIN; PUSH E TO EXIT.": CLOSE
2720  B$ = INKEY$: IF B$ = "" THEN 2720
2730  IF B$ = "E" OR B$ = "e" THEN END
2740  GOTO 2370
2750  REM       WAIT .5 SECONDS
2760  X = TIMER
2770  IF (TIMER - X) < .5 THEN 2770
2780  RETURN
2790  REM       WAIT FOR CHARACTER FROM EPROM
                PROGRAMER
```

FIGURE 5E'

```
2800  IF EOF(1) THEN 2800
2810  D$ = INPUT$(1, #1)
2820  REM       CHECK FOR RETURN TO COMMAND LINE MODE
                FROM EPROM PROGRAMER
2830  IF D$ = ">" THEN PRINT "CALIBRATION & PROGRAMING
      SUCCESSFUL":CLOSE:END
2840  REM       CHECK CHARACTOR FROM EPROM PROGRAMER
                FOR XON
2850  IF LEFT$(D$, 1) <> CHR$(17) THEN PRINT #2, D$; : GOTO
      2800
2860  PRINT #2, D$; : GOTO 2660
2870  REM       SUBROUTINGE TO FIND ANGLE FOR CURRENT
                WAVELENGTH
2880  REM       CALCULATE INITIAL GUESS FOR ANGLE
2890  P = 7.07182E-04 * L + .41718
2900  REM       SOLVE FOR NEW ANGLE
2910  X = ATN(R * SIN(T - P) / (L2 - R * COS(T - P)))
2920  Y = ATN(R * SIN(P) / (L1 - R * COS(P)))
2930  Z = N * L - SIN(P + Y)
2940  W = ATN(Z / SQR(1 - Z ^ 2))
2950  PP = W + X + T
2960  REM       CHECK CHANGE FROM OLD TO NEW VALUE
                FOR ANGLE
2970  IF ABS(PP - P) < .00001 THEN RETURN
2980  REM       REPLACE OLD VALUE WITH NEW VALUE AND
                RECALCULATE
2990  P = PP: GOTO 2910
```

FIGURE 5E"

OFF AXIS ROTATION OF DIFFRACTION GRATING

BACKGROUND OF THE INVENTION

1. Field of the Invention

This invention relates to a device and method of rotating an optical element, such as a diffraction grating for dispersing light of various wavelengths, whereby the optical element is rotated on an axis of rotation that does not intersect a point on the surface of the diffraction grating The invention is especially useful in a spectrophotometer.

2. Description of the Prior Art

The use of diffraction gratings of various configurations is common for dispersing a portion of the electromagnetic spectrum, for use for instance in spectrophotometers One method of selecting the wavelength being directed from the radiation source to a given destination point is by rotating the diffraction grating. The angular position of the diffraction grating to yield a given wavelength at the destination is easily determined and theoretically predictable for a given diffraction grating and angle of incident light from the source and of diffracted light to the destination, if the axis of rotation passes through a point on the surface of the diffraction grating.

In the conventional use (see FIG. 1) of a diffraction grating 10 on the surface of substrate 11 for wavelength selection, the relationship for wavelength as a function of grating position is shown in FIG. 1 and in equation A where $\lambda$ is the wavelength, N is the groove density of the diffraction grating (not shown), K is an integer for the diffraction order (the order of interest is typically 1), $\alpha$ is angle of incidence, and $\beta$ is the angle of diffraction.

$$KN\lambda = \SIN \alpha + \SIN \beta \tag{A}$$

The angles of incidence and diffraction are measured from a line between the light source 12 and light destination 14 respectively to the point where the axis of rotation 16 intersects the grating 10 to the normal 19 to the grating 10 at this same point. Counterclockwise angles are shown as positive in FIG. 1. Using a trigonometric identity, equation A is rewritten as equation B.

$$KN\lambda = 2 \SIN\left(\frac{\alpha+\beta}{2}\right)\cos\left(\frac{\alpha-\beta}{2}\right) \tag{B}$$

Thus, for a system where the angle between the source 12 and destination 14 is fixed and the grating 10 is rotated, both $\alpha$ and $\beta$ would be changing, but the quantity $\alpha$ minus $\beta$ will remain constant and is given by $\theta$ in equation C.

$$\theta = \alpha - \beta \tag{B}$$

With $\lambda$, N and K constant, equation B is solved for $\alpha$ plus $\beta$ as in equation D.

$$\alpha + \beta = 2 \SIN^{-1}\left(\frac{KN\lambda}{2 \cos\frac{(\alpha-\beta)}{2}}\right) \tag{D}$$

Then equations C and D are solved simultaneously for $\alpha$ and $\beta$ resulting in the required position of the grating 10. However, the diffraction grating position for rotation of the grating 10 about an axis not passing through a point on the grating 10 cannot be solved in this manner since the equations are much more complex.

Hence, in the prior art, gratings are typically rotated on axes passing through a point on the grating 10 so as to permit easy determination of the grating positioning for each desired wavelength, and gratings are not rotated about points in the grating substrate 11.

SUMMARY OF THE INVENTION

It is desirable to be able to rotate a diffraction grating to yield a deserved wavelength for a system where the axis of rotation does not intersect a point (or any point) on the surface of the diffraction grating. This capability does not exist in the prior art as described above.

The advantages of the off axis rotation is that in some applications, such as in a spectrophotometer, it is highly beneficial to rotate the diffraction grating about the center of gravity of the substrate to which the diffraction pattern is applied in order to provide a balanced, low mass moment of inertia about the axis of rotation. Rotation about the center of gravity enhances the system's ability to rapidly, accurately, and repeatedly move the position of the diffraction grating from selecting one wavelength to another. Since the diffraction grating is an optical element formed on a surface of a substrate (typically made of glass or aluminum or plastic), the center of gravity of the substrate will not generally coincide with the axis of rotation of the diffraction grating itself.

In accordance with the preferred embodiment of the present invention, a galvanometer in conjunction with a microprocessor controlled hybrid digital/analog servo system is used to move the diffraction grating for wavelength selection. A table containing a digital position information of the grating for all light wavelengths is accessed by the microprocessor to perform wavelength changes. This table is generated by a computer program which includes routines to solve for the grating position as a function of wavelength, convert the position to a format for use by the microprocessor controlling the positioning servo system, correct the resulting data for variations in the servo/optical system, and transferring the table of data to an EPROM for access by the microprocessor.

The applications of the present invention are not limited to spectrophotometers, but include all optical applications using rotating optical elements. Thus other embodiments of the present invention include, in addition to diffraction gratings, other rotating optical elements. The invention is applicable to reflective optical elements (such as mirrors) as well as transmissive optical elements such as lenses and prisms. For transmissive optical elements, the axis of rotation in accordance with the invention is located so that it does not intersect any point in the optical plane of the optical element.

BRIEF DESCRIPTION OF THE DRAWINGS

FIG. 4 shows a computer program in accordance with the invention.

FIGS. 5A, 5B, 5C, 5D and 5E show a calibration computer program in accordance with the preferred embodiment of the present invention.

Similar reference numerals in various figures identify similar or identical structures.

DETAILED DESCRIPTION OF THE DRAWINGS

Figure 2:
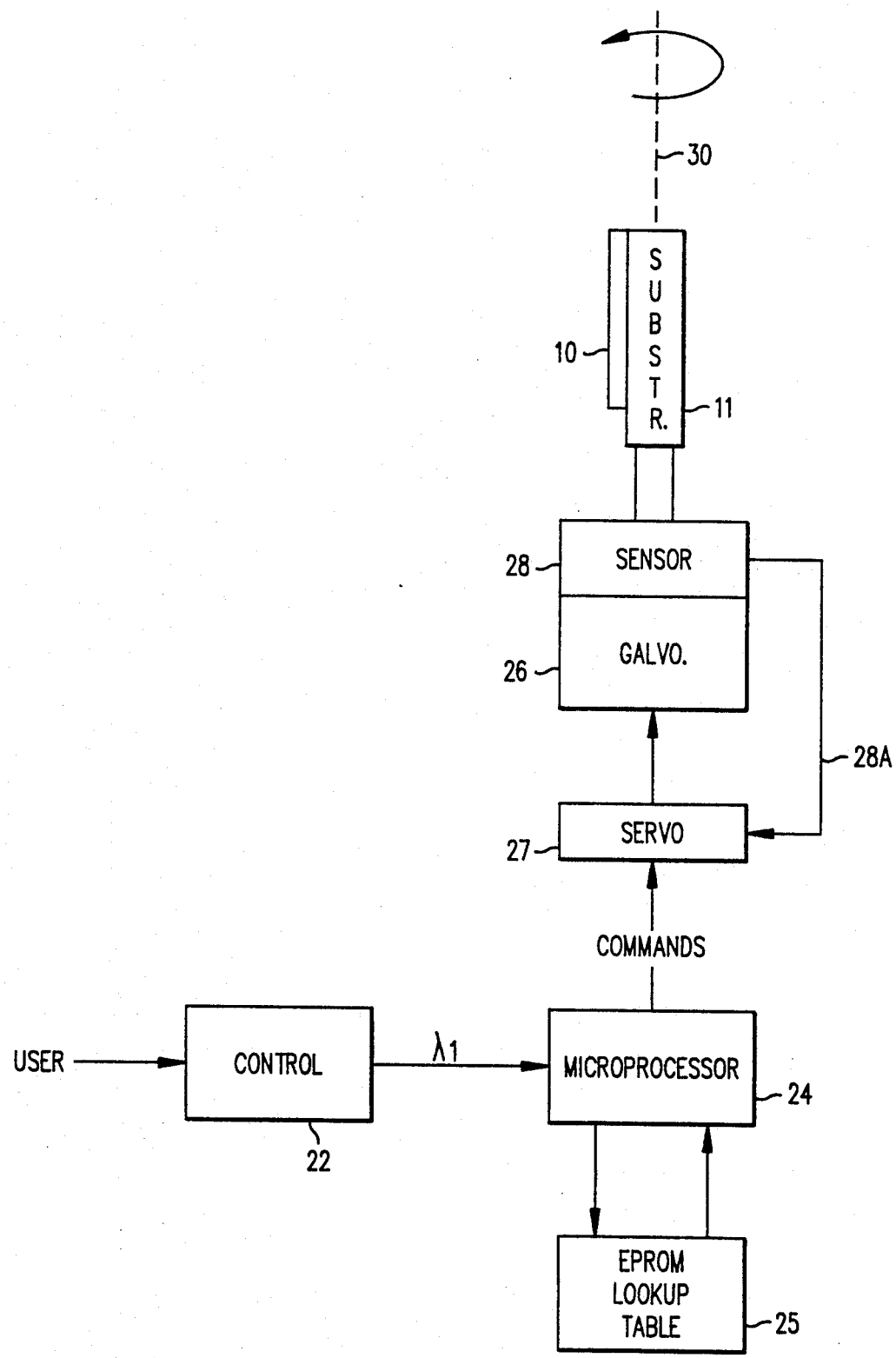
FIG. 2 shows in block form the components of a wavelength selection system in accordance with the present invention.

FIG. 2 illustrates in block diagram form the main elements of the preferred embodiment of the present invention. Control 22 (operated by a user or otherwise) conventionally selects a particular wavelength $\lambda_1$. This selection of $\lambda_1$ is provided conventionally to microprocessor 24 preferably with access to a conventional EPROM (erasable programmable read only memory) containing a lookup table 25. Microprocessor 24 then conventionally issues commands (based on the lookup table 25 values) to the servo system 27, to command galvanometer 26 to rotate on axis 30 the grating substrate 11, having on its surface grating 10, to the desired angle $\phi$. Galvanometer 26 is conventionally connected to a feedback circuit 28A which sends position sensing data from a capacitive position sensor 28 in the galvanometer 26 to the servo system 27.

Figure 1:
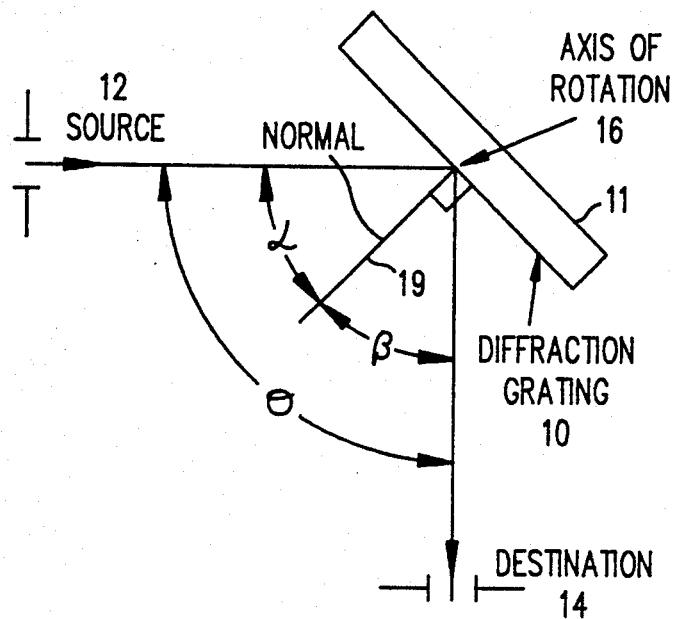
FIG. 1 shows a typical prior art use of a diffraction grating for wavelength selection.
Figure 3:
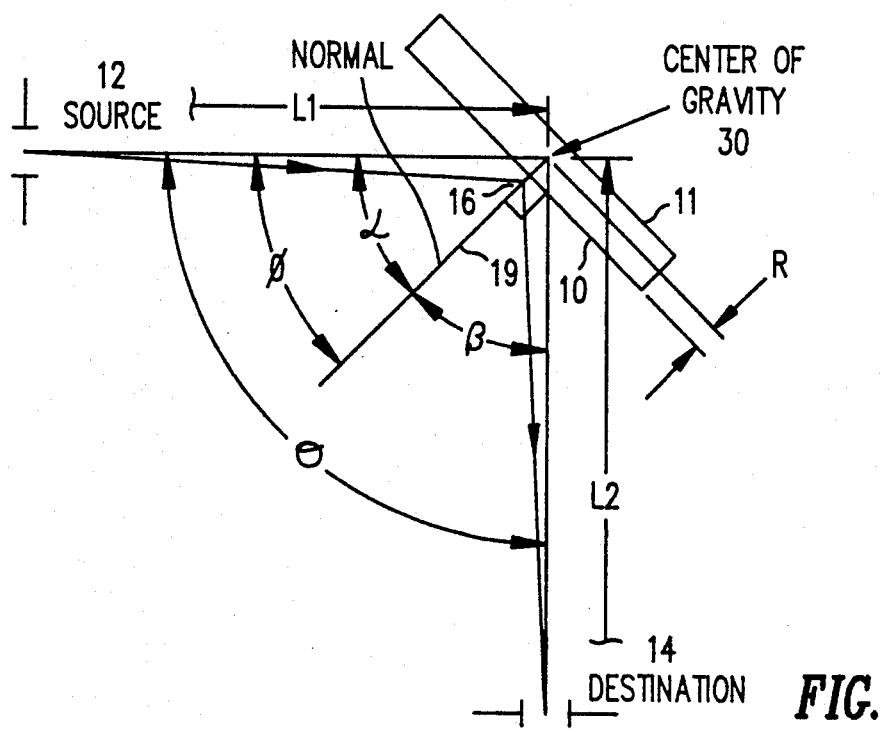
FIG. 3 shows the preferred embodiment of the present invention for wavelength selection.

FIG. 3 depicts the configuration for the off axis system as shown in block form in FIG. 2 in accordance with the preferred embodiment of the present invention. Angles $\alpha$ and $\beta$ have the same relationship to the conventional axis of rotation as in prior art FIG. 1. R is the distance from the conventional prior art axis of rotation 16 to the offset axis of rotation 30 along the normal 19 to the grating 10. Thus R is the distance between the offset axis of rotation 30 and the grating 10. As described above, in the preferred embodiment the offset axis of rotation 30 coincides with the center of gravity of the grating substrate 11.

L1 is the distance to the light source 12 and L2 is the distance to the light destination 14 from the offset axis 30. Angle $\theta$ is the constant angle measured between a line from the source 12 and offset axis 30 to the line from the destination 14 and offset axis 30. Angle $\phi$ is introduced to provide a measure of the position of the grating 10 relative to the system and is measured between a line from the source 12 and the offset axis 30 to the normal 19 to the grating 10. Equation E gives the angular relationship between the wavelength and grating 10 position for the system in FIG. 2.

$$KN\lambda = \left[\text{SIN}\left((\phi - \theta) - \tan_{L2}^{-1}\left[\frac{R \text{ SIN}(\theta - \phi)}{-R \text{ COS}(\theta - \phi)}\right]\right) + \text{SIN}\left(\phi + \tan^{-1}\left[\frac{R \text{ SIN}\phi}{L1 - R \text{ COS}\phi}\right]\right)\right] \quad (E)$$

Solving equation E for the grating position angle $\phi$ at a given wavelength $\lambda$ gives equation F.

$$\phi = \text{SIN}^{-1}\left[KN\lambda - \text{SIN}\left(\phi + \tan^{-1}\left[\frac{R \text{ SIN}\phi}{L1 - R \text{ COS}\phi}\right]\right)\right] + \theta + \tan^{-1}\left[\frac{R \text{ SIN}(\theta - \phi)}{L2 - R \text{ COS}(\theta - \phi)}\right] \quad (F)$$

Equation F is a function of angle $\phi$ in terms of itself five times. Equation F will converge to a value for $\phi$ that can be solved by a conventional iterative numerical approach.

A computer program written in BASIC is shown in FIG. 4 as an iterative routine to solve for the angle $\phi$ in the preferred embodiment of the invention.

The computer program of FIG. 4 provides the angle $\phi$, for each one of a desired set of wavelengths, to which the diffraction grating 10 must be rotated to give the desired wavelength. The lookup table is comprised of the digital position information of angle $\phi$ for the desired set of wavelengths.

The lookup table so generated is actually a nominal table for a perfectly aligned source 12 (see FIG. 3), destination 14, and diffraction grating 10. In the preferred embodiment, each individual spectrophotometer instrument is calibrated during manufacture and thus has a unique lookup table. The unique lookup table for each instrument is generated by providing light of known wavelengths to the instrument and performing a least squares fit to arrive at a correction curve for the range of desired wavelengths. The computer program (also in BASIC) used in the preferred embodiment of the invention to perform this manufacturing calibration is shown in FIGS. 5A through 5E.

The above description of the invention is illustrative and not limiting; other embodiments of the invention will be apparent in light of the teachings of the invention.

We claim:

1. An optical system comprising:
    a substrate;
    a diffraction grating formed on a surface of the substrate;
    means for rotating the substrate on an axis of rotation which intersects the substrate at a point other than at the surface on which is formed the diffraction grating.

2. The system of claim 1, wherein the axis of rotation passes through the center of gravity of the substrate.

3. The system of claim 1, wherein the means for rotating comprises:
    drive means connected to the substrate for rotating the substrate to a predetermined angle on the axis of rotation;
    control means for determining the desired wavelength of light to be propagated by the optical element upon the optical element being struck by incident light; and
    calculating means for calculating the predetermined angle.

4. The system of claim 3, wherein the drive means comprises a galvanometer.

5. The system of claim 3, wherein the calculating means solves a trigonometric equation, one of the known quantities of such equation being the distance between the axis of rotation and the optical surface.

6. The system of claim 3, wherein the calculating means comprises:
    a lookup table for providing the predetermined angle as a function of the desired wavelength.

7. An optical system comprising:
    a diffraction grating for propagation of incident light at an angle relative to an optical plane; and
    means for rotating the diffraction grating on an axis of rotation which intersects the diffraction grating an a point other than at the optical plane.

8. A method for providing light of a desired wavelength propagated from a diffraction grating formed on a surface of a substrate, the substrate having an axis of rotation passing through the substrate at a point not intersecting the surface, comprising the steps of:
   determining an angle of rotation of the substrate on the axis of rotation which corresponds to the desired wavelength; and
   rotating the substrate to the angle of rotation determined in the previous step.

9. An optical system comprising:
   a substrate;
   an optical element formed on a surface of the substrate; and
   means for rotating the substrate on an axis of rotation which intersects the substrate at a point other than at the surface on which is formed the optical element,
   wherein the means for rotating comprises:
   drive means connected to the substrate for rotating the substrate to a predetermined angle on the axis of rotation;
   control means for determining the desired wavelength of light to be propagated by the optical element upon the optical element being struck by incident light; and
   wherein the calculating means for calculating the predetermined angle, wherein the calculating means solves a trigonometric equation, one of the known quantities of such equation being the distance between the axis of rotation and the optical surface.

10. An optical system comprising:
   a substrate;
   an optical element formed on a surface of the substrate; and
   means for rotating the substrate on an axis of rotation which intersects the substrate at a point other other than at the surface on which is formed the optical element,
   wherein the means for rotating comprises:
   drive means connected to the substrate for rotating the substrate to a predetermined angle on the axis of rotation;
   control means for determining the desired wavelength of light to be propagated by the optical element upon the optical element being struck by incident light; and
   means for providing the predetermined angle as a function of the desired wavelength from a lookup table.

* * * * *